(12) United States Patent
Agardh et al.

(10) Patent No.: US 10,057,029 B2
(45) Date of Patent: Aug. 21, 2018

(54) PILOT TIME SLOT ALLOCATION FOR A MIMO SYSTEM

(71) Applicant: Sony Corporation, Tokyo (JP)

(72) Inventors: Kåre Agardh, Rydebäck (SE); Vanja Plicanic Samuelsson, Lund (SE); Erik Bengtsson, Eslöv (SE); Rickard Ljung, Helsingborg (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 15/128,016

(22) PCT Filed: Mar. 25, 2015

(86) PCT No.: PCT/EP2015/056376
§ 371 (c)(1),
(2) Date: Sep. 21, 2016

(87) PCT Pub. No.: WO2015/144753
PCT Pub. Date: Oct. 1, 2015

(65) Prior Publication Data
US 2017/0104561 A1 Apr. 13, 2017

(30) Foreign Application Priority Data
Mar. 28, 2014 (EP) .................................... 14162298

(51) Int. Cl.
*H04L 5/00* (2006.01)
*H04B 7/0452* (2017.01)

(52) U.S. Cl.
CPC ........... *H04L 5/005* (2013.01); *H04B 7/0452* (2013.01)

(58) Field of Classification Search
CPC .............................. H04L 5/005; H04L 5/0048
See application file for complete search history.

(56) References Cited

U.S. PATENT DOCUMENTS

| | | | |
|---|---|---|---|
| 2006/0172704 A1* | 8/2006 | Nishio | H04L 5/0007 455/67.11 |
| 2011/0090918 A1* | 4/2011 | Umehara | H04L 5/0048 370/442 |
| 2011/0249704 A1* | 10/2011 | Shimomura | H04J 11/00 375/141 |

OTHER PUBLICATIONS

Michaloliakos, A. et al., "Efficient MAC for distributed multiuser MIMO systems", 2013 10th Annual Conference on Wireless On-demand Network Systems and Services (WONS), IEEE, Mar. 18, 2013, pp. 52-59, XP032476930, DOI: 10.1109/WONS.2013.6578321, ISBN: 978-1-4799-0747-2 [retrieved on Aug. 12, 2013].

(Continued)

*Primary Examiner* — Feben M Haile
(74) *Attorney, Agent, or Firm* — James C. Edwards; Moore & Van Allen PLLC

(57) ABSTRACT

A cellular multiple-input and multiple-output, MIMO, system (10) comprises a base station (20) having a plurality of antennas (22) and a logic (21) which analyzes pilot signals received from a terminal (11-15) at the plurality of antennas (22) to obtain information about radio channel properties between the terminal (11-15; 100) and the plurality of antennas (22). The base station (20) assigns at least two terminals (11-13) of a plurality of terminals (11-15) to a same pilot time slot. The base station (20) requests at least two terminals (11-13) to transmit pilot signals in the allocated pilot time slot in such a manner that the at least two terminals (11, 12; 11-13) are prevented from transmitting their pilot signals simultaneously.

12 Claims, 6 Drawing Sheets

(56) References Cited

OTHER PUBLICATIONS

Shepard et al., "Argos: Practical Many-Antenna Base Stations", Mobicom 2012, Turkey, Aug. 26, 2012, pp. 53-64, XP055064219, Retrieved from the Internet: URL:http://delivery.acm.org/10.1145/2350000/2348553/p53-shepard.pdf?ip=145.64.134.247
&acc=ACTIVESERVICE
&key=986B26D8D17D60C88D75A192E3112143
&CFID=332942307&CFTOKEN=41655100
&_acm_=369660823_bf7eb4aa27031ba7ba5635ae3c857b79
[retrieved on May 27, 2013].
Huh et al., "Achieving Massive MIMO Spectral Efficiency with a Not-so-Large Number of Antennas", IEEE Transactions on Wireless Communications, IEEE Service Center, Piscataway, NJ, US, vol. 11, No. 9, Sep. 1, 2012, pp. 3226-3239, XP011463436, ISSN: 1536-1276, DOI: 10.1109/TWC.2012.070912.111383.
International Search Report and Written Opinion; dated Jun. 2, 2015; issued in International Patent Application No. PCT/EP2015/056376.

\* cited by examiner

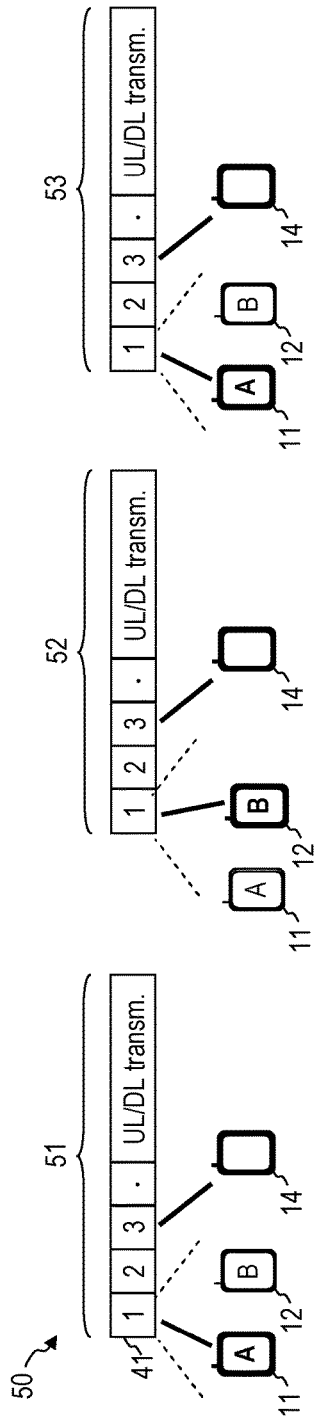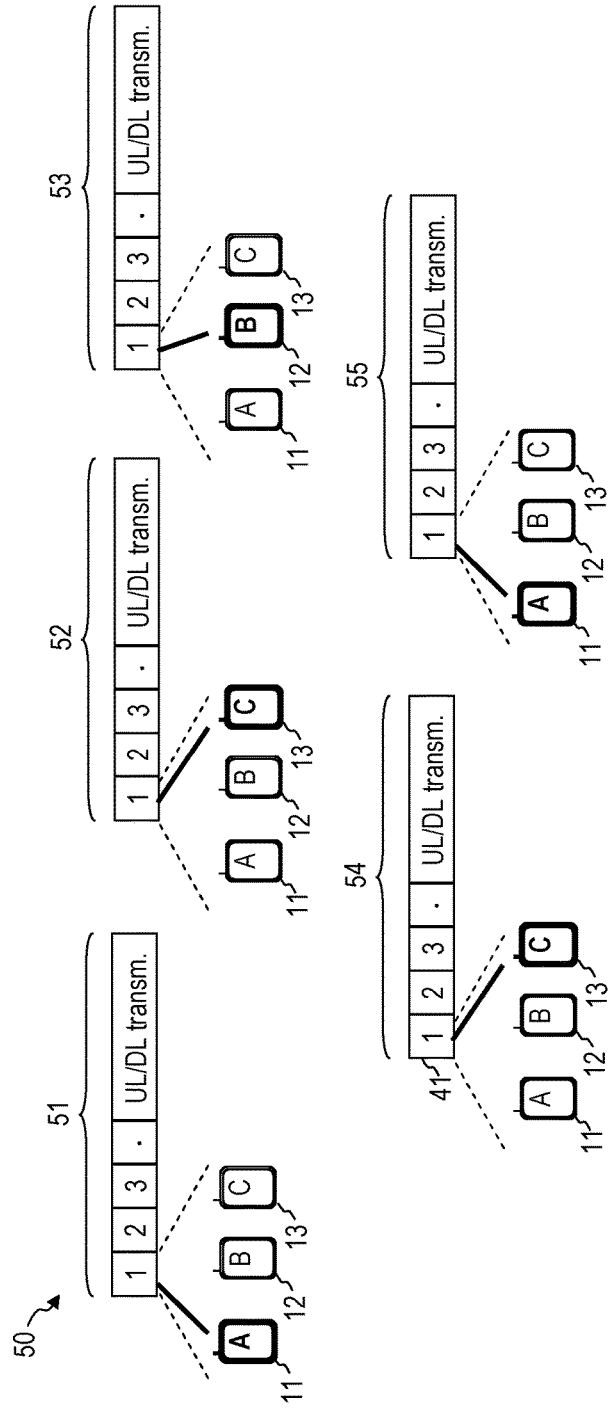
Fig. 3
Fig. 4

PILOT TIME SLOT ALLOCATION FOR A MIMO SYSTEM

FIELD OF THE INVENTION

Embodiments of the invention relate to cellular communication systems. Embodiments relate in particular to methods and devices for resource allocation in cellular multiple-input and multiple-output (MIMO) systems. Embodiments of the invention relate to a method and MIMO base station for allocating pilot time slots and to a terminal of a MIMO system.

BACKGROUND OF THE INVENTION

Mobile data and voice communication continues to evidence significant growth. With increasing popularity of data and voice communication, it is more likely that the communication needs of a large number of users must to be met which are all located within a small area, a case referred to as dense crowd scenario in the art. Typical examples include sport arenas or large office buildings.

In order to increase data transmission performance and reliability, the so-called multiple input and multiple-output (MIMO) technology may be used in wireless radio telecommunication for transmitting information between a base station and terminals of users. MIMO systems may use multiple send and receive antennas for wireless communication at a base station. The MIMO technology forms the basis for coding techniques which use the temporal as well as the spatial dimension for transmitting information. The enhanced coding provided in MIMO systems allows a quality and data rate of the wireless communication to be increased.

In a massive MIMO system, the base station may include a large number of antennas, e.g. several tens or even in excess of one hundred antennas with associated transceiver circuitry. The extra antennas of the MIMO base station allow radio energy to be spatially focused which improves capacity and radiated energy efficiency.

In order to adapt the transmit signal at each individual antenna of the base station in accordance with the currently active receiving terminals a base station logic needs information about radio channel properties between the terminals and the antennas. A pilot signaling scheme can be used for this purpose which allows the base station to set configuration antenna parameters for transmitting signals so as to focus radio energy at terminals or for receiving radio signals, for example. In a conventional MIMO system, training sequences may be transmitted from all terminals within the cell and possibly also neighboring cells in a time slot which is dedicated to the respective terminal. The training sequences need to be orthogonal in order for the base station to identify the configuration parameters for the plurality of antennas for each of the one of the terminals in conventional systems. Orthogonality may be achieved by using time division multiple access (TDMA), code division multiple access (CDMA) or frequency division multiple access (FDMA) technologies or a combination thereof.

In case the MIMO system uses time division duplex (TDD) each terminal can transmit a pilot signal, which can be received by the antennas and analyzed by the base station logic. It will be appreciated that time slots are one example for orthogonal channels, with orthogonality being attained in the time domain. In order to not interfere with each other, a certain time period can be assigned in each system frame where each terminal may transmit its pilot signal. The time slots in which terminals may transmit their pilot signals in combination are also referred to as a pilot portion of a frame. The remaining time slots of the frame may be used for downlink (DL) and uplink (UL) data transmission, with the DL and UL transmissions being performed in a plurality of time slots which may follow the header of the frame, for example. The pilot signals may each include a training sequence, with the pilot signal received at the plurality of antennas of the base station being analyzed by the base station logic. The base station may use the results of the analysis to determine configuration parameters for transmitting signals via the antennas to the respective terminals.

Massive MIMO systems may be deployed in buildings such as office buildings, shopping malls and so on, sport arenas or other areas in which a large density of users can occur. In such environments a large number of terminals may be located in the cell served by the MIMO base station. The time required for the pilot signaling of the terminals in each frame may increase with the number of terminals. For a large number of terminals, the time required for all terminals to transmit their pilot signals may exceed the available pilot signaling time in each frame. While the pilot signaling time, i.e. the number of time slots allocated to pilot signaling, may be adjusted dynamically, the transmission of payload data would be negatively affected if the pilot signaling time was increased to much.

SUMMARY OF THE INVENTION

There is a need in the art for methods and devices which address at least some of the above shortcomings of conventional systems. There is in particular a need in the art for allocating resources for pilot signaling to terminals of a multiple-input and multiple-output (MIMO) system in which terminals may continue to transmit their respective pilot signals even when the total number of terminals becomes large, e.g. greater than the number of time slots available in a pilot portion of a frame.

According to embodiments of the invention, methods and devices are provided which allow several terminals to share one of several orthogonal channels for pilot signal transmission. For illustration, in TDD, several terminals may share the same pilot time slot. In particular, the several terminals may be assigned to the one of several orthogonal channels for pilot signal transmission. E.g., the several terminals may be assigned to the same pilot time slot in such a manner that the several terminals do no longer transmit their respective pilot signals in each frame, but alternatingly transmit their pilot signals in the assigned time slot. Similar assignments can be made for other types of orthogonal channels. For illustration, a first terminal may transmit its pilot signal in a given time slot (e.g. the $n^{th}$ time slot in a header) of a first frame, and a second terminal may transmit its pilot signal in the given time slot of a second frame which is directly consecutive to the first frame. The several terminals may transmit their pilot signals in a round-robin fashion. In some implementations, only one of the several terminals assigned to the same time slot may transmit its pilot signal in each frame, so as to ensure that the several terminals do not transmit their pilot signals simultaneously.

According to embodiments of the invention, a resource allocation protocol may be implemented to assign several terminals to one pilot time slot, which is used by the several terminals in an alternating fashion. Cell specific parameters may be transmitted as broadcast control information or system information. Individual parameters which are specific for one or several terminals may be part of a dedicated control signaling of a downlink control channel. Examples for the individual parameters include an indicator for a rate at which a terminal is to transmit its pilot signal and/or an indicator for a frame in which the terminal is to transmit its pilot signal. Examples for cell specific parameters include a total number N of pilot time slots in each frame or a frame number of a current frame which is broadcast for time alignment, for example.

According to an embodiment, a method of allocating resources for a transmission of pilot signals of a plurality of terminals of a cellular MIMO system is provided. The cellular MIMO system comprises a base station having a plurality of antennas and a logic which analyzes pilot signals received from a terminal at the plurality of antennas to obtain information about radio channel properties between the terminal and the plurality of antennas. The base station allocates a number N of pilot time slots to the transmission of the pilot signals of the plurality of terminals in each one of a plurality frames. The base station assigns at least two terminals of the plurality of terminals to an $n^{th}$ pilot time slot of the N pilot time slots, where n is an integer smaller than or equal to N. The base station requests the at least two terminals to transmit pilot signals in the $n^{th}$ pilot time slot of the N pilot time slots in such a manner that the at least two terminals are prevented from transmitting their pilot signals simultaneously, i.e. such that only one of the at least two terminals transmits a pilot signal in respectively each one of the plurality of frames.

The method allows at least two terminals to share a pilot time slot. The transmission of pilot signals by the plurality of terminals remains possible even when the plurality of terminals exceeds the number N of pilot time slots. The number N of pilot time slots may be kept smaller than the number of active terminals in the cell, for example, at least when the number of active terminals exceeds a threshold value.

Two or more terminals may be assigned to the $n^{th}$ pilot time slot. It is also possible that each one of several pilot time slots of the N pilot time slots is used by more than one terminal for pilot signal transmission. The base station may assign at least two further terminals different from the at least two terminals to an $m^{th}$ pilot time slot of the N pilot time slots, with m being an integer smaller than N and different from n. The at least two further terminals may share the $m^{th}$ pilot time slot in such a way that they alternatingly transmit their respective pilot signals in the $m^{th}$ pilot time of different frames.

The base station may request the at least two terminals to transmit pilot signals in the same pilot time slot in any one of a variety of ways. Downlink control signaling may be used to inform a terminal of the at least two terminals that it shall transmit its pilot signal in non-consecutive frames, so as to allow another terminal of the at least two terminals to transmit its pilot signal in the same pilot time slot of an intervening frame. Broadcast control information may be used to inform the at least two terminals, as well as other terminals located in the same cell or in adjacent cells, of cell specific parameters, such as the total number N of pilot time slots per frame.

The base station may transmit information on at least one repetition rate at which the at least two terminals are to transmit the pilot signal to the at least two terminals. The information on the at least one repetition rate may represent a number R, and each terminal of the at least two terminals may respectively transmit its pilot signal only once in every $2^R$ frames. Other indicators may be used to indicate in which fraction of frames a terminal may respectively transmit its pilot signal.

Different repetition rates may be assigned to a first terminal and a second terminal of the at least two terminals. This allows the first terminal to transmit its pilot signal in more frames than the second terminal, for example. The base station may use various techniques to determine which terminal of the at least two terminals which share the $n^{th}$ pilot time slot is to transmit the pilot signal more frequently. For illustration, a movement of the terminals relative to the base station may be taken into account. A terminal which moves at higher speed relative to the base station may be allowed to transmit pilot signals at a higher repetition rate. This allows the base station to take into account the changing channel properties. Alternatively or additionally, changes in a footprint of the pilot signal received at the plurality of antennas of the base station may be monitored and a terminal may be allowed to transmit its pilot signal with a higher repetition rate when the footprint exhibits rapid changes.

The base station may assign the at least two terminals to at least two queues, so as to ensure that the at least two terminals will not transmit the pilot signal in the $n^{th}$ pilot time slot of the same frame.

The base station may transmit an indicator for a frame to each terminal of the at least two terminals, with the indicator indicating in which frame the respective terminal is to transmit the pilot signal.

The base station may cause the at least two terminals to transmit the pilot signals in an alternating fashion in the $n^{th}$ pilot time slot of successive frames.

Several terminals may be made to share the same one of several orthogonal channels, e.g. the same pilot time slot selectively depending on a number of active terminals in a cell. The base station may monitor a number of active terminals in a cell served by the base station. The base station may perform a comparison of the number of terminals to the number N of pilot time slots, and the at least two terminals are selectively assigned to the $n^{th}$ pilot time slot depending on a result of the comparison. The rate at which the at least two terminals transmit the pilot signals may be selectively decreased only when required based on the total number of active terminals.

The base station may select the at least two terminals which share a pilot time slot from the plurality of terminals as a function of a movement relative to the base station and/or as a function of directions in which the plurality of terminals are located relative to the base station.

The base station may select the at least two terminals which share a pilot time slot from the plurality of terminals depending on whether the separate MIMO pilot signaling is required. This may be dependent on whether different channels can be identified for the terminals, for example. For illustration, when the at least two terminals are arranged along one line of sight from the base station, there may be limited possibility in identifying different channel characteristics for these at least two terminals. The at least two terminals are assigned to share the same pilot time slot.

The at least two terminals may be arranged along one line of sight from the base station. Two or more than two terminals arranged along the same line of sight from the base station may be assigned to the $n^{th}$ pilot time slot.

The plurality of antennas of the base station may receive a first pilot signal from a first terminal of the at least two terminals in the $n^{th}$ pilot time slot of the N pilot time slots of a first frame. The first pilot signal may include a first training sequence. The base station may determine a first footprint of the first pilot signal at the plurality of antennas. The plurality of antennas of the base station may receive a second pilot signal from a second terminal of the at least two terminals in the $n^{th}$ pilot time slot of the N pilot time slots of a second frame different from the first frame, the second terminal being different from the first terminal. The base station may determine a second footprint of the second pilot signal at the plurality of antennas. The plurality of antennas may be controlled in dependence on the first footprint and the second footprint to transmit signals.

Various techniques may be used for controlling a transmission via the antennas when transmitting signals to the plurality of terminals. For illustration, a footprint matrix may be determined based on the received pilot signal. The base station logic may compute a Hermitian conjugate of the footprint matrix and may control transmission of the signal by the plurality of antennas to direct a transmit signal into an angular sector in which the at least two terminals are located. The base station logic may compute a Hermitian conjugate of the footprint matrix and may control transmission of the signal by the plurality of antennas such that radio energy is focused at an area in which terminals which share a pilot time slot are located. The control may be implemented in the digital domain. Similarly, the footprint matrix may also used to identify signals received from a terminal in the uplink.

A base station logic may evaluate the pilot signals received from the at least two terminals to determine a direction in which the at least two terminals are located. The base station logic may evaluate the pilot signals received from the at least two terminals to determine in which one of several angular sectors the at least two terminals are located. The base station logic may evaluate the pilot signals received from the at least two terminals to determine in which angular sector and at which distance from the base station the at least two terminals are located.

In operation, the base station logic may control a transmission of radio signals through the plurality of antennas so as to transmit signals directed towards various solid angle sectors. The base station may also transmit radio signals through the plurality of antennas such that the radio energy is focused at several terminals, e.g. the at least two terminals which share a pilot time slot. The base station logic does not need to specifically direct the radio beam towards an individual terminal. This may help save resources, e.g. when two or more terminals are identified to not require utilization of separate MIMO antenna pilot signaling. For illustration, when several terminals are within one line of sight from the base station, there may be limited possibility to identify different channels for each one of these terminals. The terminals may then be assigned to share the same pilot time slot.

The base station may transmit the same downlink payload to each group of terminals which share the same pilot time slot. The base station may broadcast this payload into an angular sector in which the terminals sharing the same pilot time slot are located.

When several terminals share a pilot time slot, each one of the terminals may be allowed to transmit payload in the uplink only in the frames in which it also transmits its pilot signal.

A base station for a cellular MIMO system according to an embodiment comprises a plurality of antennas and a logic coupled to the plurality of antennas. The logic is configured to analyze pilot signals received from a plurality of terminals at the plurality of antennas to obtain information about radio channel properties between the plurality of terminals and the plurality of antennas. The logic is configured to allocate a number N of pilot time slots to the transmission of the pilot signals of the plurality of terminals in each one of a plurality frames. The logic is configured to assign at least two terminals of the plurality of terminals to an $n^{th}$ pilot time slot of the N pilot time slots, where n is an integer smaller than or equal to N. The logic is configured to control the plurality of antennas to request the at least two terminals to transmit pilot signals in the $n^{th}$ pilot time slot of the N pilot time slots in such a manner that the at least two terminals are prevented from transmitting their pilot time signals simultaneously, i.e. such that only one of the at least two terminals transmits the pilot signal in respectively each one of the plurality of frames.

The base station may be configured to perform the method of any one of the embodiments disclosed herein. The respective control and evaluation operations may be performed by the base station logic.

A terminal for a cellular MIMO system according to an embodiment comprises a wireless interface having at least one antenna and a control device coupled to the wireless interface. The control device is configured to control the wireless interface to transmit a pilot signal to the base station in a pilot time slot of a plurality of non-consecutive frames to share the pilot time slot with at least one further terminal in accordance with signaling received from a base station at the wireless interface.

A terminal having such a configuration is responsive to downlink control signaling from a MIMO base station which causes the terminal to share the pilot time slot, e.g. the $n^{th}$ pilot time slot from among N pilot time slots, with at least one other terminal.

The control device may be further configured to determine a repetition rate from the signaling received from the base station and control the wireless interface to transmit the pilot signal in the plurality of non-consecutive frames, the plurality of non-consecutive frames being identified based on the repetition rate. This allows the terminal to be responsive to a repetition rate at which the terminal may transmit its pilot signal and which may be determined by the base station. The signaling may be dedicated downlink control signaling for the terminal.

The control device may be further configured to determine an indicator for a frame from the signaling received from the base station, the indicator indicating at least one frame of the plurality of non-consecutive frames. This allows the base station to be assigned to one of several queues for transmitting the pilot signal, thereby preventing simultaneous transmission of the pilot signal by the terminal and the other terminal(s) assigned to the same pilot time slot.

The wireless interface may be configured for communication with a long term evolution, LTE, cellular communication network.

The terminal may be mobile phone.

The control device may be further configured to control the wireless interface such that payload data is transmitted in the uplink only in a frame in which the terminal transmits its pilot signal.

A cellular MIMO system according to an embodiment comprises a base station according to an embodiment and several terminals according to an embodiment.

In any one of the various embodiments, the MIMO system may be a massive MIMO system. The base station may include more than ten antennas, e.g. several tens of antennas, to transmit signals. The base station may include more than hundred antennas to transmit signals. The base station antennas may be distributed. The plurality of antennas may comprise several sub-sets located at several locations remote from one another. The several sub-sets may interact with one another in cooperative MIMO.

Embodiments of the invention may be used for pilot signaling resource allocation in MIMO systems, in particular in massive MIMO systems.

Exemplary scenarios where sharing of pilot time slots between two or more terminals may be particularly useful include dense crowd scenarios, e.g. sport arenas, in which data is broadcast. For illustration, embodiments of the invention may be used for video streaming or other data streaming applications in dense crowd scenarios.

Although specific features described in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF THE DRAWINGS

Embodiments of the invention will be described in more detail with reference to the accompanying drawings in which like numerals refer to like elements.

FIG. 3 illustrates an assignment of pilot time slots for transmitting training sequences according to an embodiment of the present invention.

FIG. 4 illustrates an assignment of pilot time slots for transmitting training sequences according to an embodiment of the present invention.

DETAILED DESCRIPTION OF PREFERRED EMBODIMENTS

In the following, exemplary embodiments of the present invention will be described in more detail. It is to be understood that the features of the various exemplary embodiments described herein may be combined with each other unless specifically noted otherwise. Same reference signs in various drawings refer to similar or identical components. Any coupling between components or devices shown in the figures may be a direct or an indirect coupling unless specifically noted otherwise.

Figure 1:
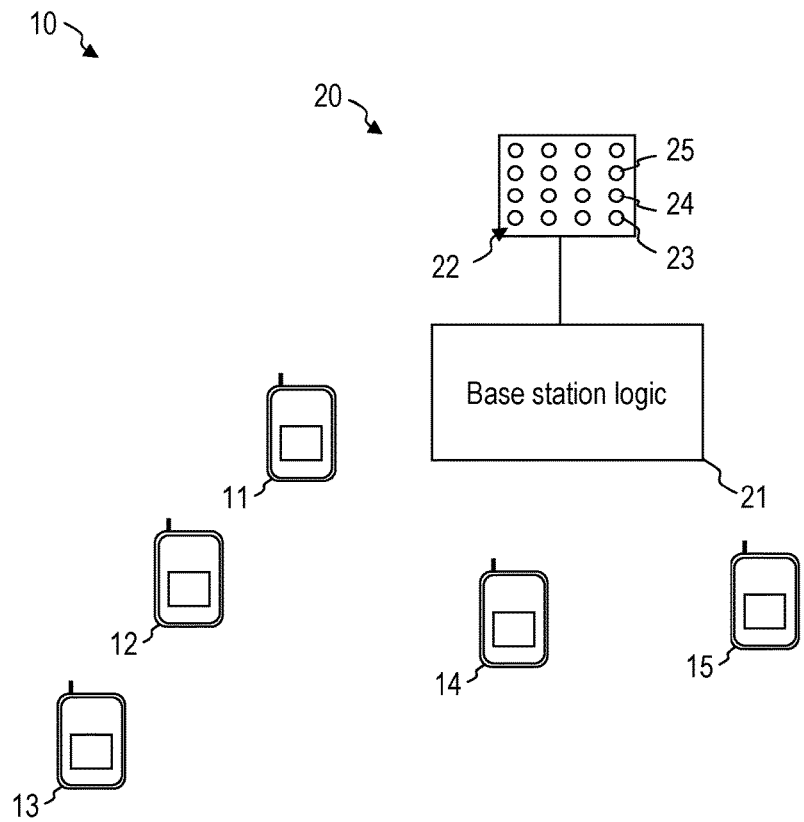
FIG. 1 shows a schematic representation of a communication system according to an embodiment.

FIG. 1 shows a communication system 10 according to an embodiment. The communication system 10 is a multiple-input and multiple-output (MIMO) system and includes a MIMO base station 20 according to an embodiment. The MIMO system may be a massive MIMO system, and the MIMO base station 20 may have a large number of antennas, such as several tens or in excess of one hundred antennas.

The base station 20 comprises a plurality of antennas 22. The antennas 23-25 may be arranged in a two- or three-dimensional spatial array on a carrier. The base station 20 also comprises associated transceivers for the antennas 23-25. The base station 20 may be a base station for a massive MIMO system. Accordingly, the base station 20 may have several tens or in excess of one hundred antennas 23-25. The plurality of antennas may also be spatially distributed to various locations, e.g. in cooperative MIMO. It is also possible that several base stations interact in cooperative MIMO, with the plurality of antennas being distributed over various locations.

The communication system 10 comprises several terminals 11-15 configured to communicate with the base station 20. Each one of the terminals 11-15 is configured to transmit a pilot signal to the base station. The pilot signal may respectively include a training sequence. The pilot signal may be a MIMO pilot signal.

The base station 20 is configured to analyze the pilot signal received at the plurality of antennas 22 of the base station to determine channel characteristics for a radio signal transmission between the plurality of antennas 22 of the base station 20 and the respective terminal 11-15. For illustration, a logic 21 of the base station 20 may be configured to determine a footprint matrix based on a pilot signal received by the plurality of antennas 22 from a terminal. The logic 21 may use the footprint matrix to control the plurality of antennas 22 when transmitting radio signals to the respective terminal. The logic 21 may compute a Hermitian conjugate of the footprint matrix to determine a time delay and amplitudes of radio signals transmitted by each one of the plurality of antennas 22 to focus radio energy in a sector in which the respective terminal is located. For illustration, the logic 21 may control a transmission of signals by the plurality of antennas 22 based on radio channel properties, e.g. based on a footprint matrix, obtained for a pilot signal transmission from a terminal 11 to control a transmission of signals by the plurality of antennas 22 to transmit a downlink (DL) signal carrying control signaling and/or payload data to a spatial sector in which the terminal 11 is located. The logic 21 may control a transmission of signals by the plurality of antennas 22 based on radio channel properties, e.g. based on a footprint matrix, obtained for a pilot signal transmission from a terminal 14 to control the plurality of antennas 22 to transmit a DL signal carrying control signaling and/or payload data to another spatial sector in which the terminal 14 is located. The logic 21 may control a transmission of signals by the plurality of antennas 22 based on radio channel properties, e.g. based on a footprint matrix, obtained for a pilot signal transmission from a terminal 15 to control the plurality of antennas 22 to transmit a DL signal carrying control signaling and/or payload data to yet another spatial sector in which the terminal 15 is located. The control may be performed in the digital domain. The control may also be performed in such a way that focusing of radio energy is not only performed as a function of direction, but also as a function of distance from the base station. For illustration, for several terminals located in the same direction and at similar distance from the base station, the base station may control the transmission of signals through the plurality of antennas in such a way that the radio energy is focused in the direction in which the terminals are located and at the distance at which the terminals are located.

The MIMO system 10 may use time division duplex (TDD) for the transmission of pilot signals. A pilot time slot may be allocated to each terminal 11-15 in which the respective terminal may transmit its pilot signal. The allocation in the time domain ensures that the various terminals 11-15 do not interfere with each other when transmitting the pilot signals.

Figure 2:
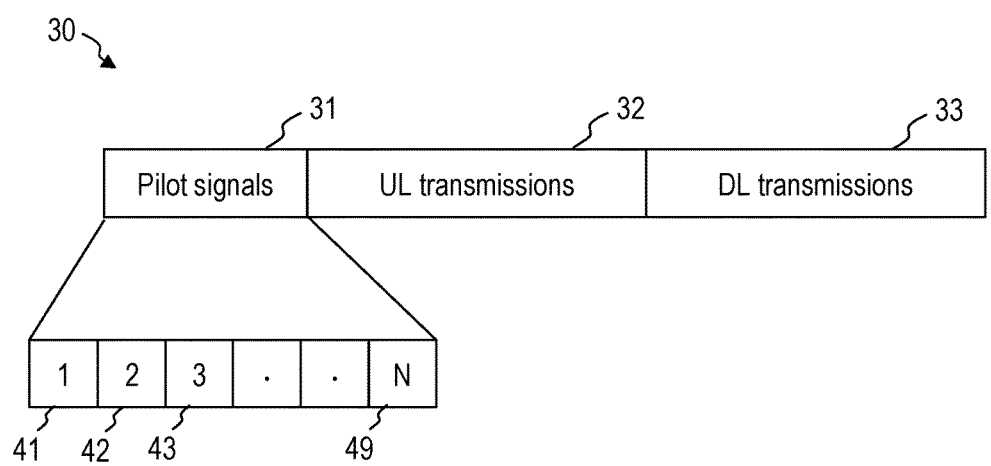
FIG. 2 shows a frame structure of a MIMO system.

FIG. 2 is a schematic representation of a frame 30 used in the MIMO system 10. The frame 30 includes a portion 32 for uplink transmissions and another portion 33 for downlink transmission. Each one of the portions 32, 33 includes a plurality of time slots. The portions 32, 33 may collectively also be referred to as data portions of the frame 30.

In addition, the frame 30 includes several pilot time slots 41-49 which are allocated for the transmission of pilot signals from the terminals 11-15 to the base station 20. The several pilot time slots 41-49 may be provided in a header 31 of the frame 30, which may also be referred to as pilot portion. The several pilot time slots 41-49 do not need to be included in the first time slots of the frame, but may also be distributed in other ways over the frame 30. The total number N of pilot time slots may, but does not need to be fixed. For illustration, the MIMO system 10 may be configured such that the number N of pilot time slots may be dynamically adjusted, for example to accommodate varying numbers of active receiving terminals.

As will be explained in more detail with reference to FIG. 3 to FIG. 10 below, the MIMO system 10 is configured such that more than one of the terminals 11-15 may be assigned to one and the same pilot time slot. For illustration, two or more than two terminals may be assigned to transmit pilot signals in a first pilot time slot 41, or more generally in an $n^{th}$ pilot time slot 41-49, with n being an integer greater than or equal than one and smaller than or equal to N, i.e. 1≤n≤N.

When several terminals are assigned to the same pilot time slot, i.e. when one pilot time slot is allocated to several terminals, the base station 20 may request the several terminals to transmit their pilot signals in an alternating manner, so as to ensure that the pilot signals of the several terminals do not interfere with each other and are not transmitted simultaneously. For illustration, when a first terminal 11 and a second terminal 12 are assigned to the $n^{th}$ pilot time slot, the first terminal 11 may transmit its pilot signal in the $n^{th}$ pilot time slot of a first frame while the second terminal 12 does not transmit any pilot signal in the first frame. The second terminal 12 may transmit its pilot signal in a second frame which is the next frame after the first frame, while the first terminal 11 does not transmit any pilot signal in the second frame.

The transmission of pilot signals in the same pilot time slot by various terminals which share the same pilot time slot may be continued in a round robin fashion. For illustration, the first terminal 11 may transmit its pilot signal in the $n^{th}$ pilot time slot of a third frame which is the next frame after the second frame while the second terminal 12 does not transmit any pilot signal in the third frame. The second terminal 12 may transmit its pilot signal in a fourth frame which is the next frame after the third frame, while the first terminal 11 does not transmit any pilot signal in the fourth frame. This may be continued.

More than two terminals may be assigned to the same pilot time slot. The repetition rates at which the various terminals transmit their respective pilot signal may be different for different terminals which share the same time slot. For illustration, when the first terminal 11, the second terminal 12, and a third terminal 13 are assigned to the $n^{th}$ pilot time slot, the first terminal 11 may transmit its pilot signal in the $n^{th}$ pilot time slot of every second frame, while the second terminal 12 and the third terminal 13 may respectively each transmit their pilot signals in the $n^{th}$ pilot time slot of every fourth frame.

Assigning more than one terminal to one of several orthogonal channels, e.g. to a pilot time slot, may be performed selectively, e.g. as a function of the number of active terminals in the cell served by the base station 20. For illustration, when the number of active terminals in the cell exceeds the maximum number N of pilot time slots which is available, at least two terminals may be assigned to the same pilot time slot.

It is also possible that the MIMO system 10 assigns several terminals to the same one of several orthogonal channels, e.g. the same pilot time slot such that the several terminals share the same channel, e.g. the same pilot time slot when the total number of active terminals is still less than the number N of channels, e.g. pilot time slots. For illustration, when several terminals are arranged along one line of sight from the base station, there may be limited possibility in trying to identifying different channel properties for these several terminals. For broadcast applications or other scenarios where the base station 20 is in Line of Sight (LoS) operation mode, the base station 20 may still direct the radio signals into the angular sector in which the several terminals are located even when the several terminals share the same pilot time slot. Broadcast of payload may also be used in non-LoS operation, in which the base station focuses signals which carry downlink payload for several terminals in the region in which the several terminals are located.

The base station 20 may transmit the same downlink payload to each group of terminals which share the same pilot time slot. The base station 20 may broadcast this payload into an angular sector or into a spatial region in which the terminals sharing the same pilot time slot are located. The radio energy may be focused in the respective angular sector or even in the region within the angular sector in which the terminals are located.

When several terminals share a pilot time slot, each one of the terminals may be allowed to transmit payload in the uplink only in the frames in which it also transmits its pilot signal.

FIG. 3 illustrates the operation of the MIMO system 10 when the base station 20 causes the first terminal 11 and the second terminal 12 to share a first time slot 41 of the N pilot time slots, for example. Other pilot time slots may respectively be allocated to only one terminal. For illustration, a third pilot time slot may be allocated to a further terminal 14.

In a sequence of frames 50, terminals which transmit a pilot signal in the respective frame are indicated with thicker lines than terminals which do not transmit pilot signals in the respective frames.

In a frame 51, the first terminal 11 transmits its pilot signal in the first pilot time slot, while the second terminal 12 does not transmit any pilot signal in the frame 51. The further terminal 14 may transmits its pilot signal in the pilot time slot of the frame 51 which is allocated to it.

In a next frame 52, the second terminal 12 transmits its pilot signal in the first pilot time slot, while the first terminal 11 does not transmit any pilot signal in the frame 52. The further terminal 14 may transmits its pilot signal in the pilot time slot of the frame 52 which is allocated to it.

The several terminals 11, 12 which share the first time slot 41 may continue to alternatingly transmit the pilot signals, implementing an alternation in pilot signal transmission in a round robin fashion. For illustration, in a next frame 53, the first terminal 11 may transmit its pilot signal in the first pilot time slot, while the second terminal 12 does not transmit any pilot signal in the frame 51. The further terminal 14 may transmits its pilot signal in the pilot time slot of the frame 51 which is allocated to it.

While not shown in FIG. 3 for clarity, each one of the pilot time slots may be allocated to at least one terminal for transmission of pilot signals. There may also be other pilot time slots, in addition to the first pilot time slot 41, which are respectively shared among at least two terminals.

When several terminals share the same pilot time slot, the various terminals do not need to transmit pilot signals at the same repetition rate. For illustration, one of the several terminals may transmit pilot signals more frequently, i.e. at a higher repetition rate, than other terminals.

FIG. 4 illustrates the operation of the MIMO system 10 when the base station 20 causes the first terminal 11, the second terminal 12 and the third terminal 30 to share a first time slot 41 of the N pilot time slots, for example. Other pilot time slots may respectively be allocated to only one terminal. For illustration, a third pilot time slot may be allocated to the further terminal 14. In a sequence of frames 50, terminals which transmit a pilot signal in the respective frame are indicated with thicker lines than terminals which do not transmit pilot signals in the respective frames.

In a frame 51, the first terminal 11 transmits its pilot signal in the first pilot time slot, while the second terminal 12 and the third terminal 13 do not transmit any pilot signal in the frame 51. Further terminals may transmit pilot signals in pilot time slots which are different from the first pilot time slot shared by the first terminal 11, the second terminal 12, and the third terminal 13 in each of the frames.

In a next frame 52, the third terminal 13 transmits its pilot signal in the first pilot time slot, while the first terminal 11 and the second terminal 12 do not transmit any pilot signal in the frame 52. In a next frame 53, the second terminal 12 transmits its pilot signal in the first pilot time slot, while the first terminal 11 and the third terminal 13 do not transmit any pilot signal in the frame 53. In a next frame 54, the third terminal 13 transmits its pilot signal in the first pilot time slot, while the first terminal 11 and the second terminal 12 do not transmit any pilot signal in the frame 54. The transmission of pilot time signals may be continued in a round robin fashion thereafter in the same way as explained with reference to frames 51 to 54. For illustration, in a next frame 55, the first terminal 11 transmits its pilot signal in the first pilot time slot, while the second terminal 12 and the third terminal 13 do not transmit any pilot signal in the frame 55.

The repetition rates at which the terminals 11-13 transmit their pilot signals are not all the same for the terminals 11-13 which share the same pilot time slot in FIG. 4.

The third terminal 13 transmits a pilot signal in every second frame. The first terminal 11 and the second terminal 12 respectively transmit a pilot signal only in every fourth frame.

Various criteria may be employed by the base station 10 to determine whether the terminal(s) which share a pilot time slot with other terminals is allowed to transmit pilot signals more frequently than the other terminals. For illustration, a terminal which moves more rapidly relative to the base station than the other terminals which share the same pilot time slot may be allowed to transmit pilot signals more frequently. Other criteria may be used. For illustration, changes in the channel properties determined by the base station logic 21 as a function of time may be monitored. A terminal for which the channel properties exhibit more rapid changes than for other terminals, e.g. due to movement of the terminal or due to shadowing effects, may be allowed to transmit pilot signals more frequently.

The base station may use DL control signaling dedicated to respectively each one of the several terminals 11-13 assigned to the same pilot time slot to provide information on the transmission of pilot signals. The DL control signaling may include information on the pilot time slot n which is to be shared by the several terminals 11-13.

The DL control signaling may optionally include additional individual parameter(s) which define in which frame(s) the respective terminal is allowed to transmit its pilot signal in the allocated $n^{th}$ pilot time slot.

One parameter may assign the terminals to different queues, so as to ensure that two terminals do not transmit their pilot signals in the allocated $n^{th}$ pilot time slot of the same frame. Referring to FIG. 3, a queue indicator value Q=1 may be transmitted to the first terminal 11 to indicate that the first terminal 11 is to start transmitting its pilot signal in the first frame 51. A queue indicator Q=2 may be transmitted to the second terminal 12 to indicate that the second terminal 12 is to start transmitting its pilot signal in the second frame 52. A time alignment between the at least two terminals 11, 12 which share the same frame may be provided by broadcast or dedicated control signaling.

Referring to FIG. 4, a queue indicator value Q=1 may be transmitted to the third terminal 13 to indicate that the third terminal 13 is to start transmitting its pilot signal in the first frame 51. A queue indicator Q=2 may be transmitted to the first terminal 11 to indicate that the first terminal 11 is to start transmitting its pilot signal in the second frame 52. A queue indicator Q=4 may be transmitted to the second terminal 12 to indicate that the second terminal 12 is to start transmitting its pilot signal in the fourth frame 54. A time alignment between the at least two terminals 11, 12 which share the same frame may be provided by broadcast or dedicated control signaling.

Time alignment information for time alignment between the several terminals which share the same pilot time slot may be broadcast. Alternatively, the alignment information for time alignment between the several terminals which share the same pilot time slot may be included in DL control signaling which is specifically directed to each one of the several terminals. The transmission of the control information to further terminals which do not share pilot time slots may thereby be prevented. The time alignment information may indicate a frame number of the present frame, for example, which ensures that the several terminals sharing the same pilot time slot have a common basis for determining the frames in which the pilot signals may be transmitted.

Another example for a parameter which may be transmitted to the several terminals 11-13 which share a pilot time slot is a repetition rate. The repetition rate may be encoded in a number which defines a number of frames in which the respective terminal can transmit the pilot signal once. A number R may be defined such that $2^R$ indicates number of frames in which the respective terminal can transmit the pilot signal once. Other indicators may be used to define the repetition rate. For illustration, a number R' may be defined which is equal to the number of frames in which the respective terminal can transmit the pilot signal once. In yet other embodiments, a pair of numbers $R_1$ and $R_2$ may be defined where $R_1/R_2$ is the fraction of frames in which the respective terminal can transmit the pilot signal.

Referring to FIG. 4, a repetition rate indicator value R=1 may be transmitted to the third terminal 13 to indicate that the third terminal 13 may transmit its pilot signal once in $2^1=2$ frames, i.e., in every second frame. A repetition rate indicator value R=2 may be transmitted to the first terminal 11 to indicate that the first terminal 11 may transmit its pilot signal once in $2^2=4$ frames, i.e., in every fourth frame. A repetition rate indicator value R=2 may be transmitted to the second terminal 12 to indicate that the second terminal 12 may transmit its pilot signal once in $2^2=4$ frames, i.e., in every fourth frame.

Additional information which is cell-specific may be broadcast. One example for such information is the total number N of pilot time slots.

Figure 5:
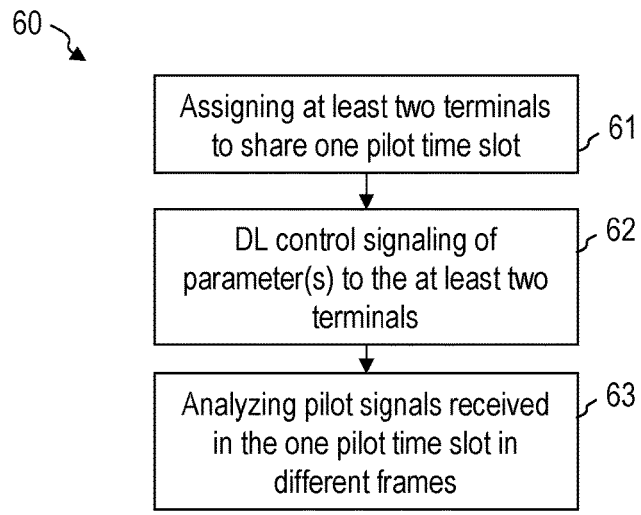
FIG. 5 is a flow chart of a method performed by a base station according to an embodiment.

FIG. 5 is a flow chart of a method 60 which may be performed by a base station 20 according to an embodiment.

At 61, the base station logic 21 assigns at least two terminals to share one pilot time slot. Two or more than two terminals may be identified which can share the same pilot time slot, e.g. the $n^{th}$ pilot time slot from among the N pilot time slots in each frame.

At 62, the base station logic 21 controls the plurality of antennas 22 to transmit one or several parameters to the at least two terminals, to instruct the at least two terminals to share the same pilot time slot in such a manner that the several terminals are instructed to transmit their pilot signals in different slots, for example. The control signaling may include the number n of the allocated pilot time slot. The control signaling may also include frame number information which defines an offset, in terms of frames, between the transmission of pilot signals by the at least two terminals. For illustration, the queue parameter value explained with reference to FIG. 3 and FIG. 4 may be used. The control signaling may also include information on a repetition rate at which the at least two terminals which share the same pilot channel are allowed to transmit their respective pilot signals. The repetition rate indicator R explained with reference to FIG. 3 and FIG. 4 may be transmitted in one exemplary implementation to inform the terminals which share one pilot time slot of the time delay between successive pilot signal transmissions.

At 63, the base station logic 21 analyzes pilot signals received in the respective pilot time slot in different frames to determine channel properties for the at least two terminals assigned to this pilot time slot. The analyzing may comprise determining parameters for controlling the antennas 22 when transmitting radio signals into a sector in which the terminals are located. The analyzing may comprise determining a footprint matrix and computing the Hermitian conjugate of the footprint matrix to determine time delays and relative signal amplitudes for directing a beam into a sector in which the terminals sharing the pilot time slot are located.

Several terminals may be selectively assigned to share the same pilot time slot based on one or several criteria. A pilot time slot may be allocated to at least two terminals if the total number of active terminals in the cell exceeds the number N of pilot time slots. Alternatively or additionally, a pilot time slot may be allocated to at least two terminals if the base station identifies that the at least two terminals generate similar or substantially identical footprints at the plurality of antennas, e.g. because the at least two terminals are located along one line of sight from the base station.

Figure 6:
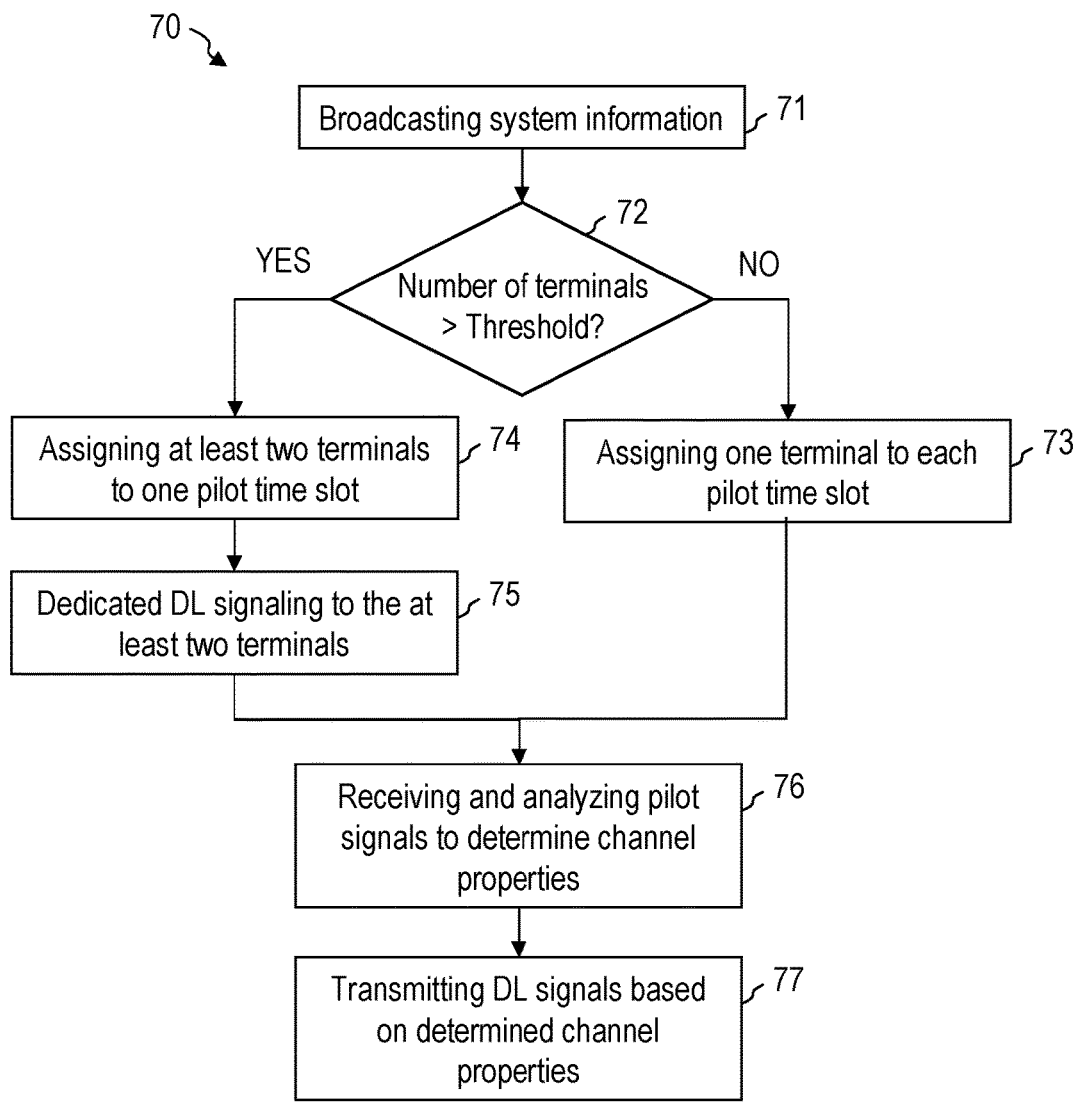
FIG. 6 is a flow chart of a method performed by a base station according to an embodiment.

FIG. 6 is a flow chart of a method 70 performed by a method according to an embodiment in which several terminals are made to share one pilot time slot in a selective manner, depending on the number of active terminals in the cell.

At 71, the base station may broadcast system information. The system information may indicate the number N of pilot time slots in each frame, for example.

At 72, the base station may determine whether the total number of active terminals in the cell is greater than a threshold. The threshold may be equal to the maximum number N of pilot time slots or may otherwise relate to the number N of available time slots. If the number of active terminals does not exceed the number N of pilot time slots, each terminal may be allocated a separate pilot time slot at 73 and the method may proceed to step 76. The threshold may be equal to or less than the maximum allowed number of pilot time slots. For illustration, as a number of terminals in a cell grows, the base station may monitor whether the number of allocated pilot time slots reaches a threshold which is still less than the maximum number of pilot time slots allowed. Terminals may be requested to share a pilot time slot as soon as the base station determines that this threshold has been reached. A hysteretic behavior may be implemented in which an upper threshold of pilot time slots causes the base station to request terminals to start sharing pilot time slots, while a lower threshold causes the base station to allocate one pilot time slot per terminal which needs to transmit pilot signals.

At 74, if the number of active terminals exceeds the number of available pilot time slots, at least two terminals may be assigned to the same pilot time slot, e.g. the $n^{th}$ pilot time slot among the N pilot time slots. The at least two terminals may be selected from among the plurality of terminals located in the cell based on any one of a variety of criteria. For illustration, stationary terminals or slowly moving terminals may be selected to share one pilot time slot, whereas more rapidly moving terminals may be allocated a dedicated pilot time slot. Alternatively or additionally, terminals for which the channel properties do not vary frequently, e.g. because shadowing or other transient changes in the channel properties do not occur too frequently, may be selected to share one pilot time slot. Time-dependent changes in the channel properties determined by analyzing several pilot signals transmitted by a terminal, e.g. time-dependent changes in a footprint matrix, may be used as criterion for determining whether the respective terminal is a suitable candidate for sharing the pilot time slot with one or more other terminals. Terminals for which the channel properties change less rapidly are better candidates for pilot time slot sharing than terminals for which the channel properties change more rapidly. A terminal may be identified as a suitable candidate for pilot time slot sharing when it has a footprint at the MIMO antenna of the base station which is the same or substantially the same as a footprint of at least one other terminal.

At 75, the base station logic 21 controls a transmission of radio signals by each one of the plurality of antennas 22 to transmit one or several parameters to the at least two terminals. This may be done so as to instruct the at least two terminals to share the same pilot time slot in such a manner that the several terminals are prevented from transmitting their pilot signals in the same frame, for example. The control signaling may include the number n of the allocated pilot time slot. The control signaling may include other parameters, as explained with reference to FIG. 1 to FIG. 5 above.

At 76, the base station logic 21 analyzes pilot signals received in the respective pilot time slot in different frames to determine channel properties for the at least two terminals assigned to this pilot time slot, e.g. the $n^{th}$ pilot time slot from among N available pilot time slots. The analyzing may comprise determining parameters for controlling the plurality of antennas 22 when transmitting radio signals into a sector in which the terminals are located. The analyzing may comprise determining a footprint matrix for the terminals and computing the Hermitian conjugate of the footprint matrix to determine time delays and relative signal amplitudes for directing a beam or beams which interfere in a constructive way into a sector in which the terminals are located.

At 77, the base station logic 21 may control a transmission of radio signals by each one of the plurality of antennas 22 to transmit radio signals carrying payload or control signaling into the sector or into a spatial region in which the at least two terminals are located. The time delays, i.e. phase shifts, and amplitudes of the signals transmitted by the plurality of antennas 22 at step 77 may be set based on the channel properties determined at step 76.

Figure 7:
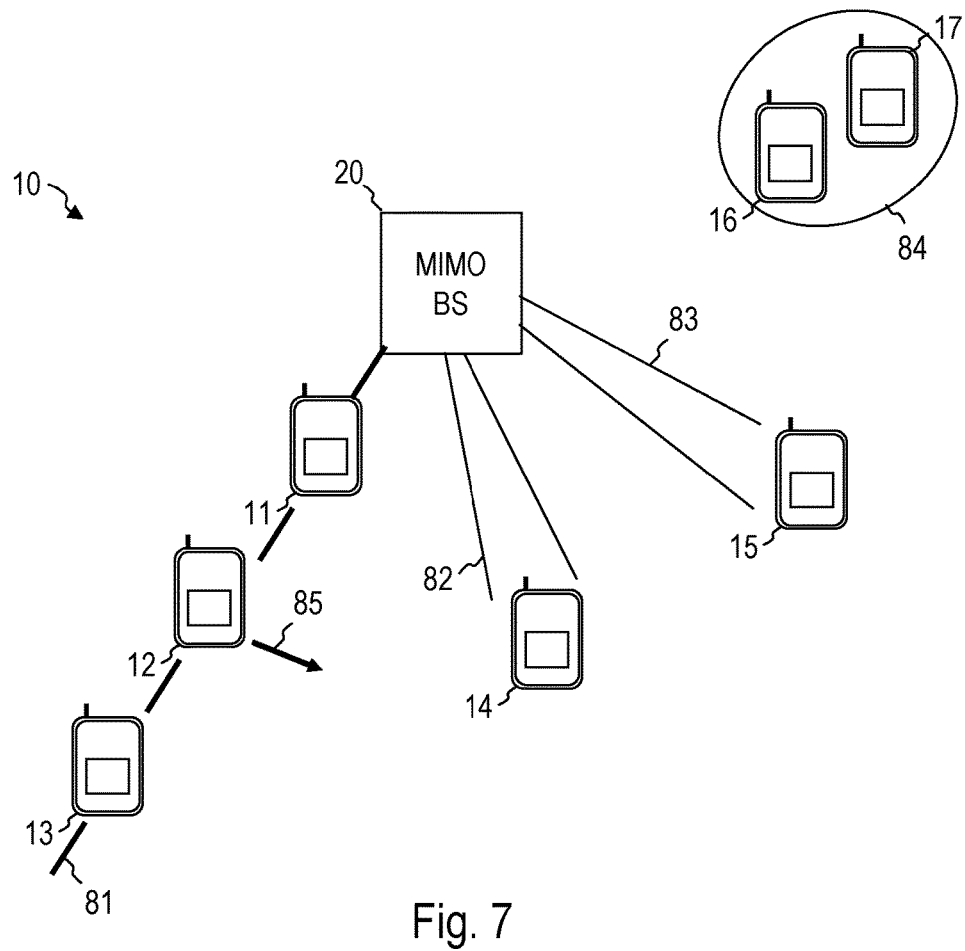
FIG. 7 is a plan view of a communication system according to a embodiment.

FIG. 7 is a plan view of the MIMO system 10 according to an embodiment which illustrates criteria for assigning several terminals 11-13 to the same pilot time slot.

The several terminals 11-13 are located along one and the same line of sight 81 from the base station 20. Accordingly, there may be limited possibility for the base station to try to identify different channel properties, e.g. different footprint matrices, for these several terminals 11-13. The base station may determine that no separate massive MIMO pilot signaling is required for the several terminals 11-13 and may allocate the same pilot time slot to each one of the several terminals 11-13, such that the pilot time slot is used in an alternating fashion by the several terminals 11-13.

Alternatively or additionally, a movement 85 of the terminals(s) may also be taken into account. A terminal 12 which moves relative to the base station 20 may be allocated a dedicated pilot time slot, even when it located along the same line of sight 81 as the terminals 11, 13.

Similarly, further terminals 14, 15 may be caused to respectively share another pilot time slot with one or several other terminal(s) located in the same angular sectors 82, 83 relative to the base station 20. The base station 20 may identify such groups of terminals based on the footprints detected at the plurality of antennas 22 of the base station 20.

The plurality of antennas 22 may be positioned in a two- or three-dimensional arrangement. Radio energy may not only be focused as a function of direction, but also as a function of distance within an angular sector.

For illustration, further terminals 16, 17 which generate the same footprint matrix at the plurality of antennas 22 may be located in a region 84. The base station may focus radio energy in the region 84, based on the footprint matrix determined for the terminals 16, 17, e.g. when broadcasting payload in the downlink.

In the operation mode, the base station 20 may transmit radio signals carrying DL payload data or control signaling into angular sectors 82, 83, rather than attempting to focus radio energy at one terminal only. The payload transmitted in the beam may be a data stream, e.g. of video data such as 4K or 8K video streaming, which can be received and processed by the terminals located in the respective angular sector. The base station 20 may also transmit radio signals carrying DL payload data or control signaling such that the radio energy is focused in a region 84.

Figure 8:
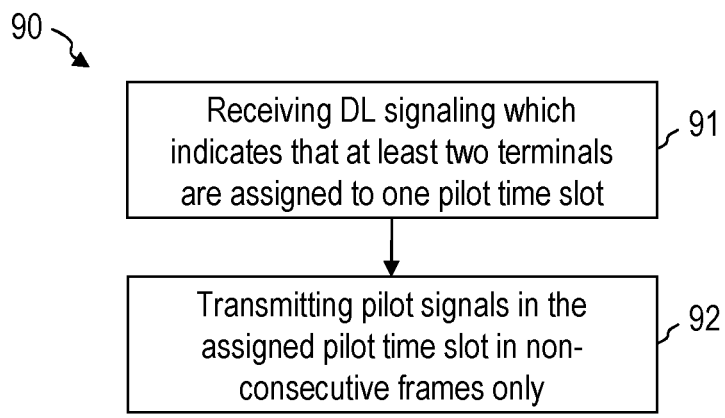
FIG. 8 is a flow chart of a method performed by a terminal according to an embodiment.

FIG. 8 is a flow chart of a method 90 performed by a terminal 11-15 according to an embodiment. The terminal is responsive to the control signaling received from the base station, which causes the terminal to share a pilot time slot with one or several other terminals.

At 91, the terminal receives DL control signaling which includes one or several parameters which cause the terminal to share a pilot time channel with one or several other terminals. The parameters may include the number n of the allocated pilot time slot. The parameters may include information on a repetition rate, which may indicate in how many frames the terminal is allowed to transmit its pilot signal once. Additional information may be received in the dedicated DL control signaling or in a broadcast from the base station, e.g. a frame number for time alignment which ensures that the terminal and all other terminals assigned to the same pilot time slot use the same time reference.

At 92, the terminal transmits pilot signals in the allocated pilot time slot, e.g. the $n^{th}$ pilot time slot from among N pilot time slots, of non-consecutive frames. The terminal may identify the frames in which it may transmit its pilot signal in the allocated pilot time slot using the parameters received from the base station at 91. The terminal may not transmit any pilot signal in the frames in between the non-consecutive frames defined by the parameters received at 91. This allows one or several other terminals assigned to the same pilot time slot to transmit their pilot signals in the respective pilot time slot in between the pilot signal transmissions of the terminal.

Figure 9:
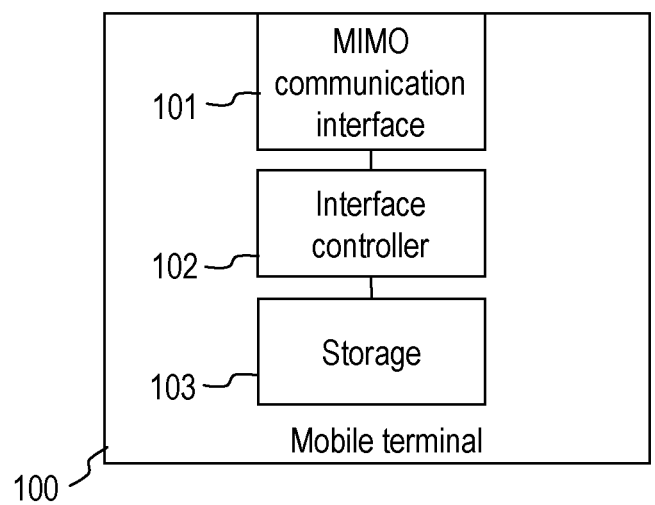
FIG. 9 is a block diagram of a terminal according to an embodiment.

FIG. 9 is a schematic block diagram of a terminal 100 according to an embodiment, which may be a mobile phone. The terminal 100 has an interface 101 configured for communication with a massive MIMO base station 20. The interface 101 has at least one antenna and may also include several antennas.

The terminal 100 has an interface controller 102. The interface controller 102 may include one or several processors, for example. The interface controller 102 may be configured to control the interface 101 to transmit a pilot signal. The pilot signal may include a training sequence. The interface controller 102 may be configured to identify frames in which the terminal 100 may transmit its pilot signal in an allocated pilot time slot using parameters received from the base station at 91. The interface controller 102 may be configured to control the interface 101 such that the terminal 100 does not transmit any pilot signal in the frames in between the non-consecutive frames defined by the parameters received from the base station. This allows one or several other terminals assigned to the same pilot time slot to transmit their pilot signals in the respective pilot time slot in between the pilot signal transmissions of the terminal.

The terminal 100 has a storage unit 103, which may be implemented as a volatile or non-volatile memory. Parameters which define the timing with which the terminal 100 is allowed to transmit its pilot signal may be stored at least temporarily in the storage unit 103. For illustration, the allocated pilot time slot number n, information indicating the repetition rate of pilot signal transmissions or information indicating a frame in which the pilot signal may be transmitted may be stored in the storage unit 103. The interface controller 102 may retrieve this information to determine in which frames the pilot signal may be transmitted in the allocated pilot time slot.

Figure 10:
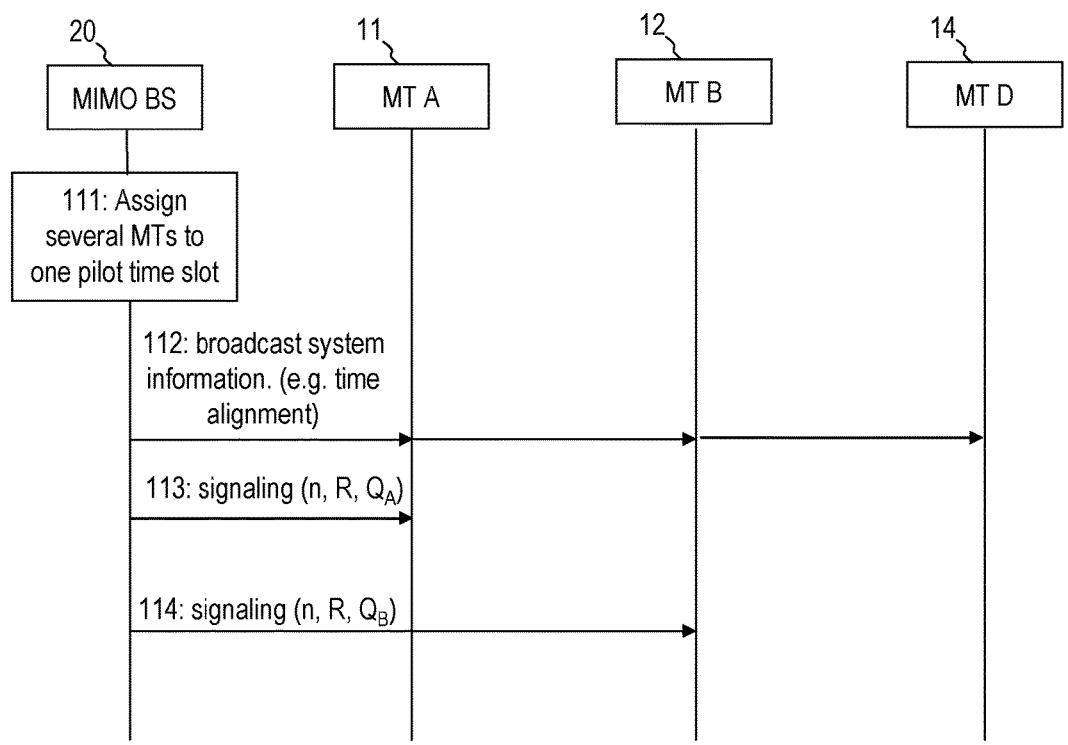
FIG. 10 is a diagram representing a signal flow in a communication system according to an embodiment.

FIG. 10 illustrates a signaling in a communication system according to an embodiment. The communication system includes a MIMO base station 20 and a plurality of terminals 11, 12, 14.

At 111, the MIMO base station 20 determines that several terminals are to be assigned to one pilot time slot. I.e., the same pilot time slot is allocated to the several terminals 11, 12.

The MIMO base station 20 may transmit system information in a broadcast message 112. The system information may include a number N of pilot time slots per frame. The system information in the broadcast 112 may also include a frame number used by at least the terminals 11, 12 for time alignment.

At 113, the base station uses dedicated control signaling as part of a downlink control channel to transmit individual parameters to a first terminal 11 which shares the pilot time slot. The individual parameters may include the information which allows the first terminal 11 to transmit its pilot signal in a manner alternating with the pilot signal transmission of other terminal(s) 12 which share the same pilot time slot. The individual parameters may define a repetition rate for pilot signal transmissions. The individual parameters may identify one frame in which the first terminal 11 is to transmit a pilot signal, e.g. by providing a queue parameter $Q_A$ which assigns the first terminal 11 to one of several queue.

At 114, the base station uses dedicated control signaling as part of a downlink control channel to transmit individual parameters to a second terminal 12 which shares the pilot time slot. The individual parameters may include the information which allows the second terminal 12 to transmit its pilot signal in a manner alternating with the pilot signal transmission of other terminal(s) 11 which share the same pilot time slot. The individual parameters may define a repetition rate for pilot signal transmissions. The repetition rate may be the same or different from the repetition rate signaled to another terminal 11 which shares the same pilot time slot. The individual parameters may identify one frame in which the second terminal 12 is to transmit a pilot signal, e.g. by providing a queue parameter $Q_B$ which assigns the second terminal 12 to one of several queue. The queue numbers Q of the various terminals are different for different terminals which share the same pilot time slot.

It will be appreciated that methods and devices according to embodiments allow several terminals to share one pilot time slot. The embodiments may allow the base station to ensure that the several terminals do not transmit their respective pilot signals simultaneously.

A pilot signaling resource allocation as implemented in embodiments of the invention may also be used in combination with conventional resource allocation schemes in which only one terminal is assigned to one pilot time slot. For illustration, as long as the number of terminals does not exceed the number N of pilot time slots, a dedicated pilot time slot may be allocated to each terminal and each terminal may transmit a pilot signal in each frame, as illustrated in FIG. 11.

Figure 11:
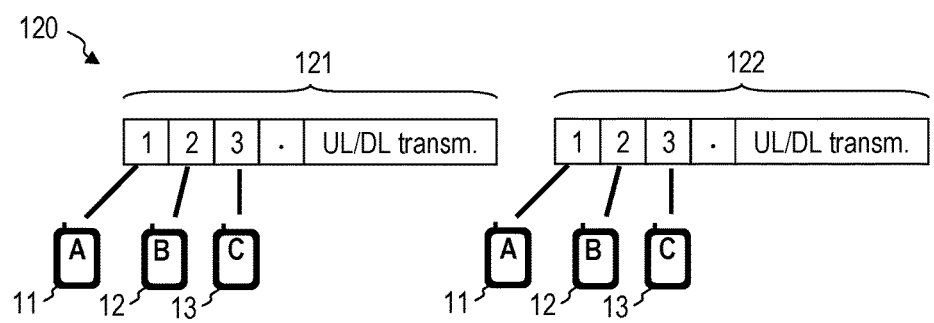
FIG. 11 shows a conventional pilot time slot allocation.

FIG. 11 illustrates a sequence of frames 120 in which conventional pilot time slot allocation is performed. A dedicated pilot time slot is allocated to each terminal 11-13. Each one of the plurality of terminals 11-13 transmits a pilot signal in each one of several successive frames 121, 122.

While embodiments have been described with reference to the drawings, modifications and alterations may be implemented in other embodiments.

For illustration, while information on a repetition rate for pilot signal transmissions may be transmitted to terminals, the repetition rate does not need to be transmitted if a default repetition rate is used and/or if explicit signaling is used to request a terminal to transmit its pilot signal. While embodiments have been described in which various parameters may be transmitted to terminals to ensure that the terminals transmit their pilot signals in the shared time slot in an alternating manner, such that different frames are used by different terminals, an explicit signaling may also be used to request transmission of a pilot signal. For further illustration, while the terminals may be mobile phones, the terminals may also be configured as a any one of a wide variety of other portable devices, for example. For further illustration, while embodiments of the invention may be used for video or other data streaming in dense crowd scenarios, the embodiments are not limited to this particular field of use.

While embodiments may assign several terminals to share the same pilot time slot when the several terminals are located along a line of sight from the base station, the techniques may generally be used whenever it is determined that no separate MIMO pilot signaling is required for the several terminals.

Embodiments of the invention may be used in massive MIMO systems, without being limited thereto.

The invention claimed is:

1. A method of allocating resources for a transmission of pilot signals of a plurality of terminals of a cellular multiple-input and multiple-output, MIMO, system, the cellular MIMO system comprising a base station having a plurality of antennas and a logic which analyzes pilot signals received from a terminal at the plurality of antennas to obtain information about radio channel properties between the terminal and the plurality of antennas, the method comprising:

allocating, by the base station, a number N of pilot time slots to the transmission of the pilot signals of the plurality of terminals in each one of a plurality frames;

assigning, by the base station, at least two terminals of the plurality of terminals to an $n^{th}$ pilot time slot of the N pilot time slots, where n is an integer smaller than or equal to N;

requesting, by the base station, the at least two terminals to transmit pilot signals in the $n^{th}$ pilot time slot of the N pilot time slots in such a manner that the at least two terminals are prevented from transmitting their pilot signals simultaneously in respectively each one of the plurality of frames;

receiving, by the plurality of antennas of the base station, a first pilot signal from a first terminal of the at least two terminals in the $n^{th}$ pilot time slot of the N pilot time slots of a first frame;

determining, by the base station, a first footprint of the first pilot signal at the plurality of antennas;

receiving, by the plurality of antennas of the base station, a second pilot signal from a second terminal of the at least two terminals in the $n^{th}$ pilot time slot of the N pilot time slots of a second frame different from the first frame, the second terminal being different from the first terminal;

determining, by the base station, a second footprint of the second pilot signal at the plurality of antennas; and controlling the plurality of antennas in dependence on the first footprint and the second footprint to transmit signals.

2. The method of claim 1, wherein the requesting comprises:

transmitting information on at least one repetition rate at which the at least two terminals are to transmit the pilot signal to the at least two terminals.

3. The method of claim 2, wherein different repetition rates are assigned to a first terminal and a second terminal of the at least two terminals.

4. The method of claim 2, wherein the requesting comprises:

transmitting an indicator for a frame to each terminal of the at least two terminals, the indicator indicating in which frame the respective terminal is to transmit the pilot signal.

5. The method of claim 1, wherein the base station causes the at least two terminals to transmit the pilot signals in an alternating fashion in the $n^{th}$ pilot time slot of successive frames.

6. The method of claim 1, further comprising:
monitoring, by the base station, a number of terminals in a cell served by the base station, and
performing a comparison of the number of terminals to the number N of pilot time slots,
wherein the at least two terminals are selectively assigned to the $n^{th}$ pilot time slot depending on a result of the comparison.

7. The method of claim 1, wherein the assigning comprises selecting the at least two terminals from the plurality of terminals as a function of a movement relative to the base station and/or as a function of directions in which the plurality of terminals are located relative to the base station.

8. The method of claim 1, wherein the at least two terminals have a same footprint matrix at the plurality of antennas.

9. The method of claim 1, wherein the same downlink payload data is transmitted to the at least two terminals by the base station, and
wherein the base station receives uplink payload data from a terminal of the at least two terminals only in frames in which the respective terminal transmits its pilot signal.

10. A base station for a cellular multiple-input and multiple-output, MIMO, system, the base station comprising:
a plurality of antennas; and
a logic coupled to the plurality of antennas and configured to
analyze pilot signals received from a plurality of terminals at the plurality of antennas to obtain information about radio channel properties between the plurality of terminals and the plurality of antennas,
allocate a number N of pilot time slots to the transmission of the pilot signals of the plurality of terminals in each one of a plurality frames,
assign at least two terminals of the plurality of terminals to an $n^{th}$ pilot time slot of the N pilot time slots, where n is an integer smaller than or equal to N,
control the plurality of antennas to request the at least two terminals to transmit pilot signals in the $n^{th}$ pilot time slot of the N pilot time slots in such a manner that the at least two terminals are prevented from transmitting their pilot signals simultaneously in respectively each one of the plurality of frames,
receive a first pilot signal from a first terminal of the at least two terminals in the $n^{th}$ pilot time slot of the N pilot time slots of a first frame,
determine a first footprint of the first pilot signal at the plurality of antennas,
receive a second pilot signal from a second terminal of the at least two terminals in the $n^{th}$ pilot time slot of the N pilot time slots of a second frame different from the first frame, the second terminal being different from the first terminal,
determine a second footprint of the second pilot signal at the plurality of antennas, and
control the plurality of antennas in dependence on the first footprint and the second footprint to transmit signals.

11. A cellular multiple-input and multiple-output, MIMO, system, comprising:
a base station according to claim 10, and
a plurality of terminals, each terminal comprising:
a wireless interface having at least one antenna; and
a control device coupled to the wireless interface and configured to
control the wireless interface to transmit a pilot signal to a base station in a pilot time slot of a plurality of non-consecutive frames to share the pilot time slot with at least one further terminal in accordance with signaling received from a base station at the wireless interface.

12. A cellular multiple-input and multiple-output, MIMO, system, comprising:
a first terminal comprising a plurality of first antennas and a first logic coupled to the plurality of first antennas, wherein the first logic is configured to:
receive a first request from a Base Station (BS) to transmit pilot signals in an $n^{th}$ pilot time slot of N pilot time slots in a first frame, and
transmit, to a plurality of BS antennas via the first antennas, a first pilot signal in the $n^{th}$ pilot time slot of the N pilot in the first frame; and
a second terminal comprising a plurality of second antennas and a second logic coupled to the plurality of second antennas, wherein the second logic is configured to:
receive a second request from the BS to transmit pilot signals in the $n^{th}$ pilot time slot of N pilot time slots in a second frame, and
transmit, to a plurality of BS antennas via the second antennas, a second pilot signal in the $n^{th}$ pilot time slot of the N pilot in the first frame,
wherein upon receipt of the first and second pilot signals, the BS determines corresponding first and second footprints for the first and second pilot signals and controls the plurality of BS antennas in dependence of the first and second footprints.

* * * * *